(12) United States Patent
Ishigami et al.

(10) Patent No.: US 10,041,791 B2
(45) Date of Patent: Aug. 7, 2018

(54) OBJECT DETECTION APPARATUS METHOD

(71) Applicant: DENSO CORPORATION, Kariya, Aichi-pref. (JP)

(72) Inventors: Hirotake Ishigami, Kariya (JP); Ken Tanabe, Kariya (JP); Hiroaki Ito, Susono (JP); Masakazu Nishijima, Ebina (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 201 days.

(21) Appl. No.: 15/215,367

(22) Filed: Jul. 20, 2016

(65) Prior Publication Data

US 2017/0024875 A1 Jan. 26, 2017

(30) Foreign Application Priority Data

Jul. 21, 2015 (JP) ................................. 2015-143878

(51) Int. Cl.
*G01C 3/08* (2006.01)
*G06K 9/00* (2006.01)
*G01C 3/14* (2006.01)

(52) U.S. Cl.
CPC ........... *G01C 3/08* (2013.01); *G06K 9/00805* (2013.01); *G01C 3/14* (2013.01)

(58) Field of Classification Search
CPC ......... G01C 3/08; G01C 3/14; G06K 9/00805
USPC ....................................................... 382/103
See application file for complete search history.

(56) References Cited

U.S. PATENT DOCUMENTS

2014/0226908 A1 8/2014 Nomoto
2015/0278578 A1* 10/2015 Otsuka ................... G08G 1/166
382/103

FOREIGN PATENT DOCUMENTS

| JP | 2009-176091 A | 8/2009 |
| JP | 2011-128844 A | 6/2011 |
| JP | 2014-149776 A | 8/2014 |

* cited by examiner

*Primary Examiner* — Amandeep Saini
(74) *Attorney, Agent, or Firm* — Knobbe, Martens, Olson & Bear, LLP (57) ABSTRACT

In an object detection apparatus, a range image generator, based on distance information indicative of distances from a given measurement point to objects in real space, generates a range image indicative of a distribution of distance information of objects located around the measurement point. A subgroup generator horizontally divides the range image into a number of column regions of prescribed width, and for each column region, generates one or more subgroups that extend continuously in a vertical direction of the range image and fall within a given range of distance information. A continuity determiner determines, for each of the subgroups, whether or not there is distance continuity between the subgroup and its horizontally adjacent subgroup in the range image. A merger merges together horizontally continuous-in-distance subgroups. An object detector detects an object in each of regions of the range image corresponding to the respective merged groups.

7 Claims, 9 Drawing Sheets

OBJECT DETECTION APPARATUS METHOD

CROSS-REFERENCE TO RELATED APPLICATION

This application is based on and claims the benefit of priority from earlier Japanese Patent Application No. 2015-143878 filed Jul. 21, 2015, the description of which is incorporated herein by reference.

BACKGROUND

Technical Field

The present invention relates to an apparatus and a method for detecting an object based on a range image.

Related Art

Conventionally, various object detection apparatuses for a vehicle driving assistance system have been proposed for detecting objects around a vehicle carrying the system to perform collision avoidance control. For example, an object detection apparatus disclosed in Japanese Patent Application Laid-Open Publication No. 2014-96005 is configured to generate a range image based on a pair of grayscale images and group adjacent regions in the range image having range data representing close distances. However, a grouping region made by grouping adjacent regions may include different objects located at substantially the same distances from the vehicle carrying the apparatus. The object detection apparatus is configured to determine whether or not the grouping region can be divided based on vertical brightness differences on the range image. If the grouping region can be divided, the apparatus detects objects in sub-regions obtained by dividing the grouping region.

The object detection apparatus divides the grouping region using brightness information on the grayscale image, which may increase processing load. Thus, a vehicle-mounted apparatus with a limited memory capacity and a limited memory access speed needs an increased amount of time to detect objects, which may make it difficult to detect objects in real time. In addition, to reduce the processing load, the object detection apparatus disclosed in Japanese Patent Application Laid-Open Publication No. 2014-96005 detects objects in the grouping region of the range image, which may degrade the object detection performance.

In consideration of the foregoing, exemplary embodiments of the present invention are directed to providing techniques for detecting objects while both suppressing processing load and preventing object detection performance degradation in a compatible manner.

SUMMARY

In accordance with an exemplary embodiment of the present invention, there is provided an object detection apparatus including: a range image generator configured to, based on distance information indicative of distances from a given measurement point to objects in real space, generate a range image indicative of a distribution of distance information of objects located around the measurement point, a vertical direction of the range image corresponding to an up-down direction of the real space; a subgroup generator configured to divide the range image generated by the range image generator in a horizontal direction of the range image into a number of column regions of prescribed width, and for each column region, generate one or more subgroups that extend continuously in a vertical direction of the range image and fall within a given range of distance information; a continuity determiner configured to, for each of the subgroups generated by the subgroup generator, determine whether or not there is distance continuity between the subgroup and its horizontally adjacent subgroup in the range image; a merger configured to merge together horizontally continuous-in-distance subgroups, between any pair of horizontally adjacent subgroups of which it is determined by the continuity determiner that there is distance continuity, to generate a merged group; and an object detector configured to detect an object in each of regions of the range image corresponding to the respective merged groups generated by the merger.

With this apparatus configured as above, based on the distance information indicative of distances from a given measurement point to objects in real space, the range image indicative of a distribution of distance information of the objects located around the measurement point is generated. The range image is horizontally divided into a number of column regions of prescribed width. In each column region, one or more subgroups are generated, each of which continuously extends in the vertical direction of the range image and falls within a given range of distance information. For each of the subgroups generated in the column regions, it is determined whether or not there is distance continuity between the subgroup and its horizontally adjacent subgroup in the range image. Horizontally continuous-in-distance subgroups are merged together to generate a merged group. Thus, subgroups are merged together, whereby for each object a merged group corresponding to the object can be generated. Further, the merged groups can be generated using only the range image, which can suppress the processing load. An object can be detected in each of regions of the range image corresponding to the respective merged subgroups, which can lead to higher accuracy of detecting objects. Therefore, objects can be detected while both suppressing processing load and preventing object detection performance degradation in a compatible manner.

Further, with this apparatus configured as above, distance continuity can be determined in the vertical direction of the range image. Thereafter, distance continuity can be determined in the horizontal direction of the range image. This has a remarkable effect of suppressing the processing load in three-dimensional object detection. More specifically, the three-dimensional objects have smaller variations in distance in the vertical direction than the other objects than the three-dimensional objects have. Therefore, determining the variations in distance in the vertical direction prior to determining the variations in distance in the horizontal direction can facilitate extraction of the three-dimensional objects. The subsequent processing may be performed only on regions where the three-dimensional objects are likely to exist.

DESCRIPTION OF SPECIFIC EMBODIMENTS

The invention will now be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

An object detection apparatus in accordance with one embodiment of the present invention is mounted in a vehicle and configured to detect objects around the vehicle. The vehicle carrying the apparatus is hereinafter referred to as an own vehicle.

The object detection apparatus of the present embodiment will now be described with reference to FIG. 1. The object detection apparatus may be an electronic control unit (ECU) 20. The ECU 20 is configured to acquire a pair of grayscale images captured by a left camera 11 and a right camera 12 and detect objects located around the own vehicle 50 based on the pair of grayscale images.

The left camera 11 and the right camera 12 may be configured as a pair of charge-coupled device (CCD) image sensors, metal-oxide semiconductor (MOS) image sensors, near infra-red sensors or other types of cameras to form a stereoscopic camera. The left camera 11 and the right camera 12 may be mounted on left and right ends of a rear-view mirror of the own vehicle 50 to capture images of an area that spans a pre-defined angular range horizontally with respect to a traveling direction. The left camera 11 transmits a left grayscale image to the ECU 20 every predetermined time interval, and the right camera 12 transmits a right grayscale image to the ECU 20 every predetermined time interval. Levels of shading of the grayscale images may be indicated by brightness values.

The ECU 20 may be microcomputer-based to include a central processing unit (CPU), read-only memory (ROM), a random-access memory (RAM), an input/output (I/O) interface and other components.

Figure 1:
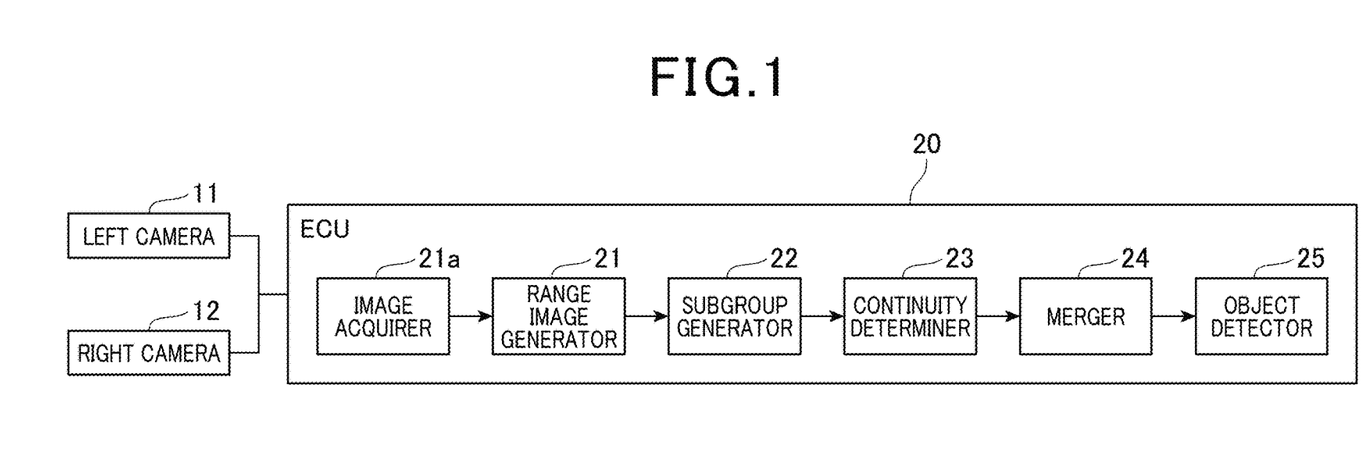
FIG. 1 a block diagram of an object detection apparatus in accordance with one embodiment of the present invention.

As shown in FIG. 1, the ECU 20 includes, as functional blocks, an image acquirer 21a, a range image generator 21, a subgroup generator 22, a continuity determiner 23, a merger 24, and an object detector 25. Functions of the image acquirer 21a, the range image generator 21, the subgroup generator 22, the continuity determiner 23, the merger 24, and the object detector 25 may be implemented by the CPU executing computer programs stored in the ROM or the like.

The image acquirer 21a is configured to acquire a pair of left and right grayscale images from the left camera 11 and the right camera 12.

Figure 2:
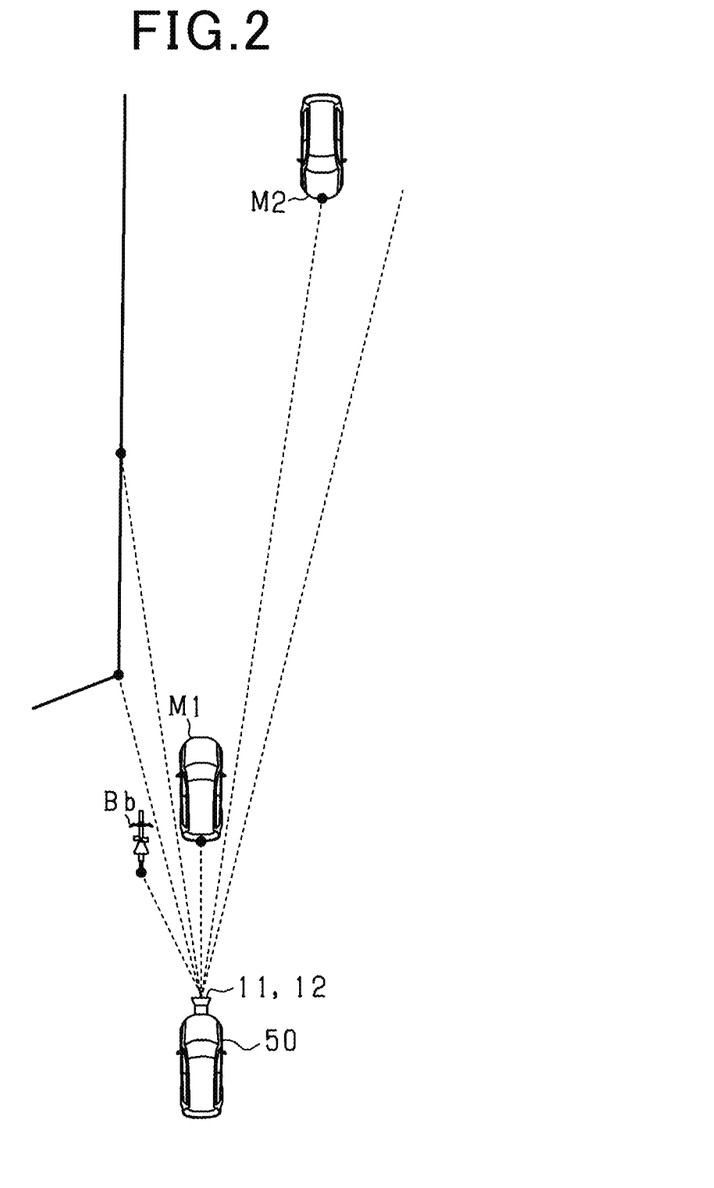
FIG. 2 is a top down view of a positional relationship between an own vehicle and objects located around the own vehicle.
Figure 3:
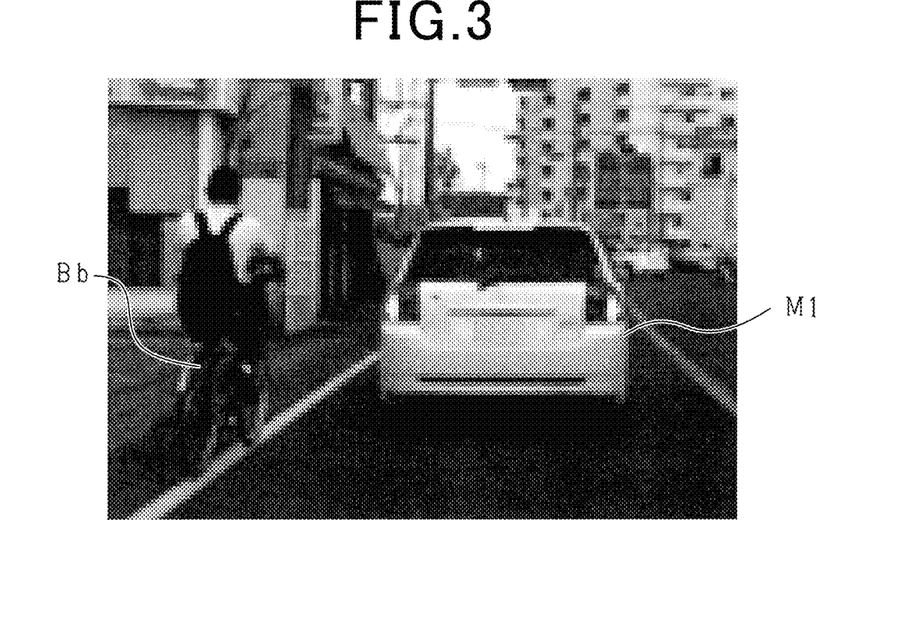
FIG. 3 is an example grayscale image captured in a situation shown in FIG. 2.

The range image generator 21 is configured to generate, from the pair of left and right grayscale images acquired by the image acquirer 21a, a range image indicative of a distribution of distance information of objects located around the own vehicle 50 (the own vehicle 50 serving as a measurement point). For example, in the presence of a vehicle M1 (as a preceding vehicle) other than the own vehicle 50 and a bicycle Bb traveling in the own lane (i.e., a lane in which the own vehicle is traveling) ahead of the own vehicle 50 and another vehicle M2 traveling in an oncoming lane, the left camera 11 and the right camera 12 will generate grayscale images as shown in FIG. 3. The grayscale image shown in FIG. 3 is an example grayscale image captured by either one of the left camera 11 and the right camera 12. A positional difference in a widthwise direction of the own vehicle 50 between the left camera 11 and the right camera 12 causes a disparity between the grayscale images captured by the left camera 11 and the right camera 12. For a given object, there is a one-to-one correspondence between the disparity for the object and a distance from the principal points of the left camera 11 and the right camera 12 to the object. That is, the disparity provides distance information that is information indicative of the distance from the own vehicle 50 to the object in real space. The range image is indicative of a distribution of disparities of the objects located around the own vehicle 50.

Figure 4:
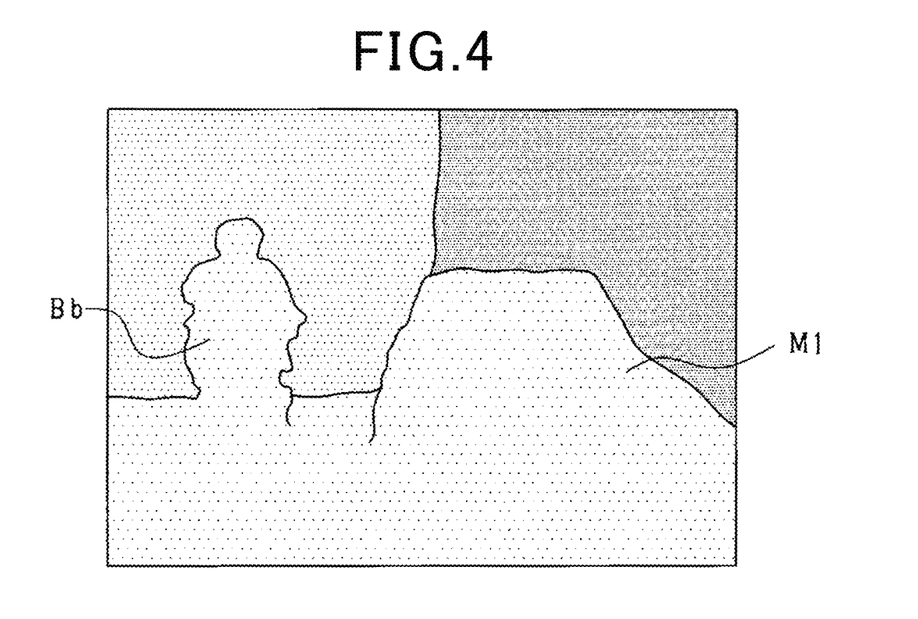
FIG. 4 is a range image calculated from the grayscale image shown in FIG. 3.

The range image generator 21 is configured to, using a well-known technique, calculate the disparity between the pair of left and right grayscale images for each prescribed pixel block. The range image generator 21 generates a range image indicative of a distribution of disparities for the objects located around the own vehicle 50 based on the calculated disparity between a pair of left and right grayscale images for each prescribed pixel block. The vertical direction of the range image corresponds to an up-down direction of the real space. FIG. 4 schematically shows the range image, where an object located at a greater distance from the own vehicle 50 is shown with denser hatching. The vehicle M1 and the bicycle Bb are located at similar distances.

Figure 5:
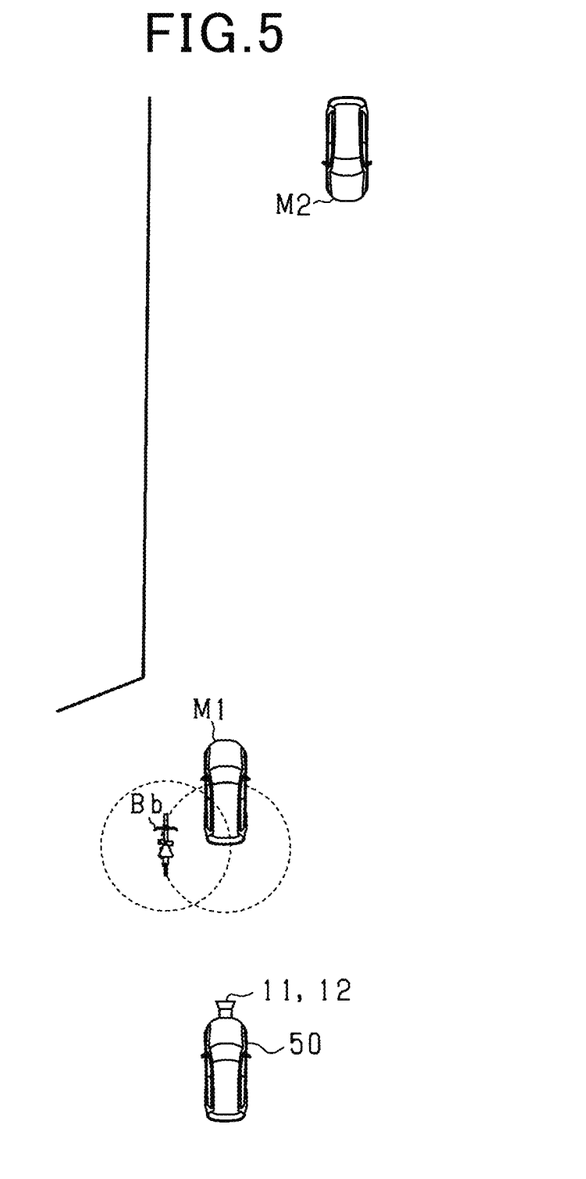
FIG. 5 is a top down view of a region where objects are in the vicinity of each other.
Figure 6:
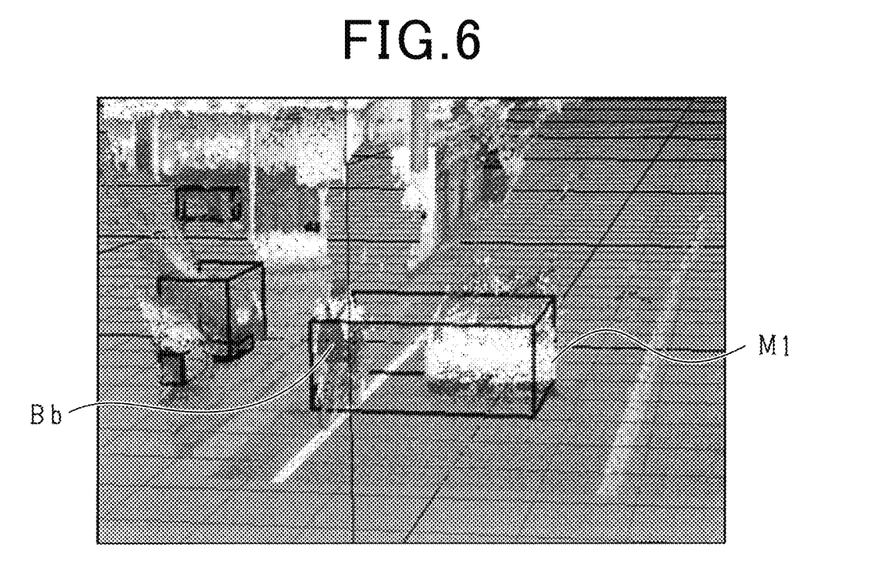
FIG. 6 is a simple grouping of regions close to each other.

In the range image generated by the range image generator 21, regions corresponding to similar distances are grouped together. For each grouping of regions corresponding to similar distances, a grouping region is defined as a region including the grouping of regions. Detecting objects in each grouping region allows objects located at different distances from the own vehicle 50 to be detected separately. However, as shown in FIG. 5, grouping together objects that are close to each other in three dimensions in a simple manner may cause objects included in a common circle to be grouped together. In such a manner, as shown in FIG. 6, the vehicle M1 and the bicycle Bb will be grouped together in the range image. Thus, regions corresponding to actually different objects may be over-grouped together, which may degrade object detection performance. Dividing each grouping region by distance using brightness information of the grayscale image may lead to excessive processing load, which may reduce a response speed in object detection. In the vehicle driving assistance system, to prevent collision, it is desired to detect the objects early. Reduction in the response speed is undesirable.

In the present embodiment, two-step grouping processing is performed with respect to distance continuity in vertical and horizontal directions of the range image. Such a grouping technique can prevent object detection performance degradation while suppressing the processing load. The grouping technique of the present embodiment will now be described.

The subgroup generator 22 horizontally divides the range image generated by the range image generator 21 into a number of column regions of prescribed width Dn. The subgroup generator 22 generates subgroups, each of which continuously extends in the vertical direction of the range image and falls within a given range of distance information. The prescribed width Dn is a unit width that can prevent over-grouping, and is set such that a reference object located at a predefined distance (e.g., a few tens of 1 m) from the own vehicle 50 can be detected. More specifically, the prescribed width Dn may be set to less than a width of the reference object located at the predefined distance from the own vehicle 50. The reference object may be a traffic sign pole or the like.

Figure 7:
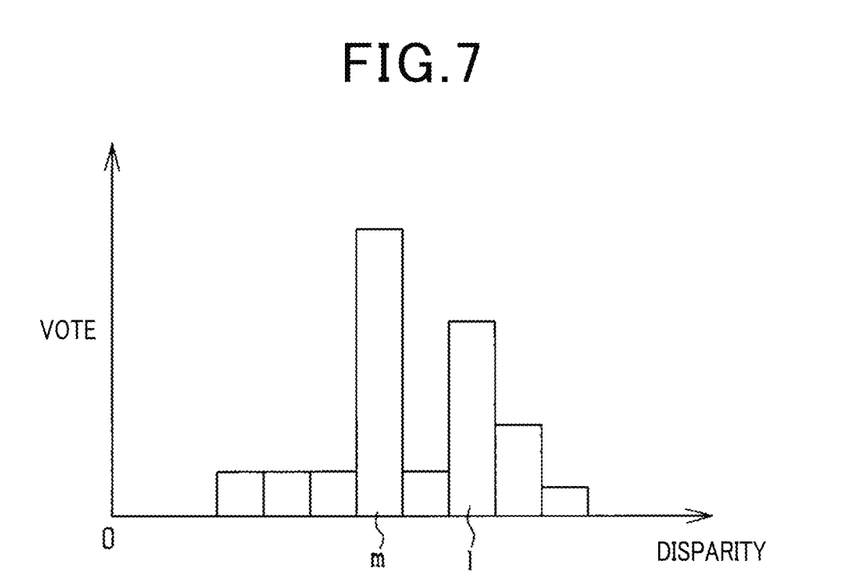
FIG. 7 is an example histogram generated by dividing the range image into a number of column regions of prescribed width.
Figure 8:
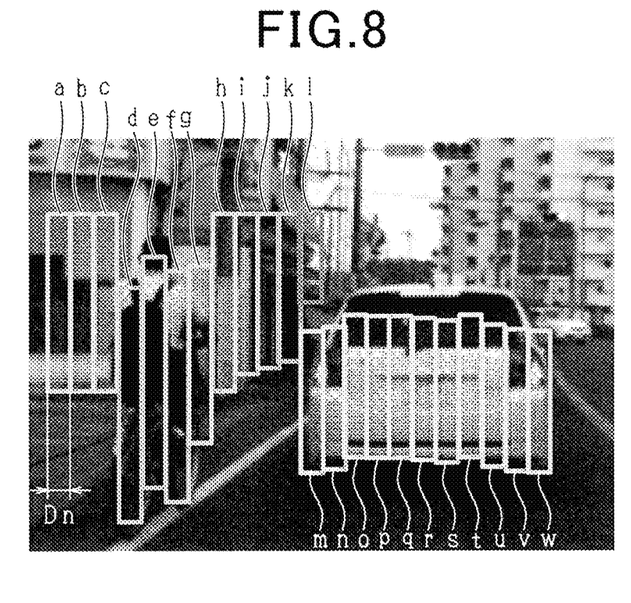
FIG. 8 is an example of subgroups in respective column regions.

More specifically, for each column region of the range image, the subgroup generator 22 partitions the whole range of disparity into equal predetermined sub-ranges and votes pixels of the column region for their respectively corresponding sub-ranges, thereby creating a histogram as shown in FIG. 7. The subgroup generator 22 selects a sub-range of disparity having a relatively large number of votes (i.e., pixels) and generates a subgroup extending continuously in the vertical direction of the range image. As an example, subgroups a-w as shown in FIG. 8 are generated in this way. In the presence of a plurality of sub-ranges having a relatively large number of votes, e.g., subgroups l, m, as shown in FIG. 7, a plurality of subgroups may be generated. Each subgroup corresponds to a given range of disparity, that is, a given range of distance, in the vertical direction of the range image. For illustration, in FIG. 8, an overlay of these subgroups is presented not on the range image, but on the grayscale image.

The continuity determiner 23 is configured to, for each of the subgroups generated by the subgroup generator 22, determine whether or not there is distance continuity to its adjacent subgroup in the horizontal direction of the range image. The merger 24 is configured to merge horizontally continuous-in-distance subgroups, between any pair of horizontally adjacent subgroups of which it is determined by the continuity determiner 23 that there is distance continuity, thereby generating separate merged groups.

Figure 11:
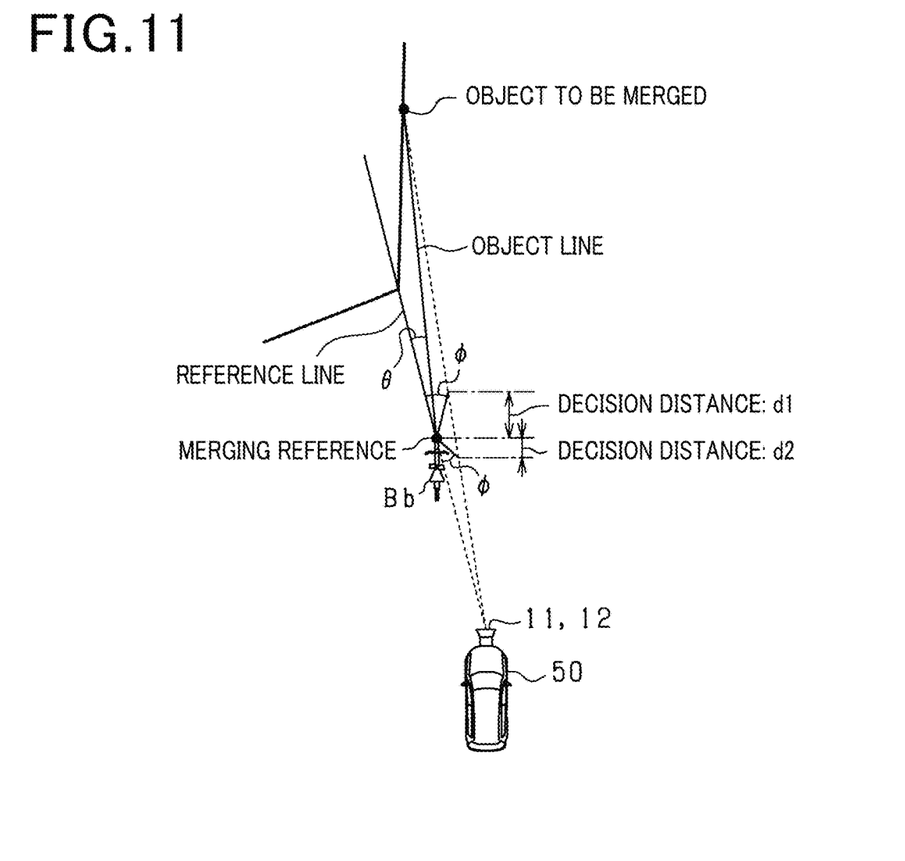
FIG. 11 is a schematic of determining distance continuity between subgroups.

The continuity determination processing will now be described in more detail with reference to FIG. 11. FIG. 11 plots locations of a subgroup as a merging reference, a subgroup to be merged (as a merge object) with the merging reference, and the own vehicle 50 in a horizontal plane. For example, to determine whether or not there is distance continuity of a subgroup b with a subgroup a, it is supposed that the subgroup a serves as a merging reference and the subgroup b serves as a subgroup to be merged. An acute angle between a reference line passing though the subgroup a and the own vehicle 50 and an object line passing though the subgroup a and the subgroup b is referred to as an object angle θ. The continuity determiner 23 is configured to, if the object angle θ is greater than a decision angle φ, determine that there is distance continuity of the subgroup b with the subgroup a in the horizontal plane.

A distance in the horizontal plane between the two subgroups spaced a prescribed width Dn apart in the horizontal direction of the range image increases with decreasing object angle θ. Therefore, use of the object angle θ allows the distance continuity in the horizontal plane to be determined. Alternatively, as shown in FIG. 11, a decision distance d1 on a further side of the merging reference from the own vehicle 50 and a decision distance d2 on a nearer side of the merging reference from the own vehicle 50 may be calculated based on the distance from the own vehicle 50 to the merging reference, the prescribed width Dn, and the decision angle φ, and may be used to determine the distance continuity in the horizontal plane. If the subgroup to be merged is within the distance d1 on the further side or within a distance d2 on the nearer side, it may be determined that there is distance continuity between the two subgroups.

Use of the object angle θ to determine the distance continuity can provide the following advantages.

Figure 12:
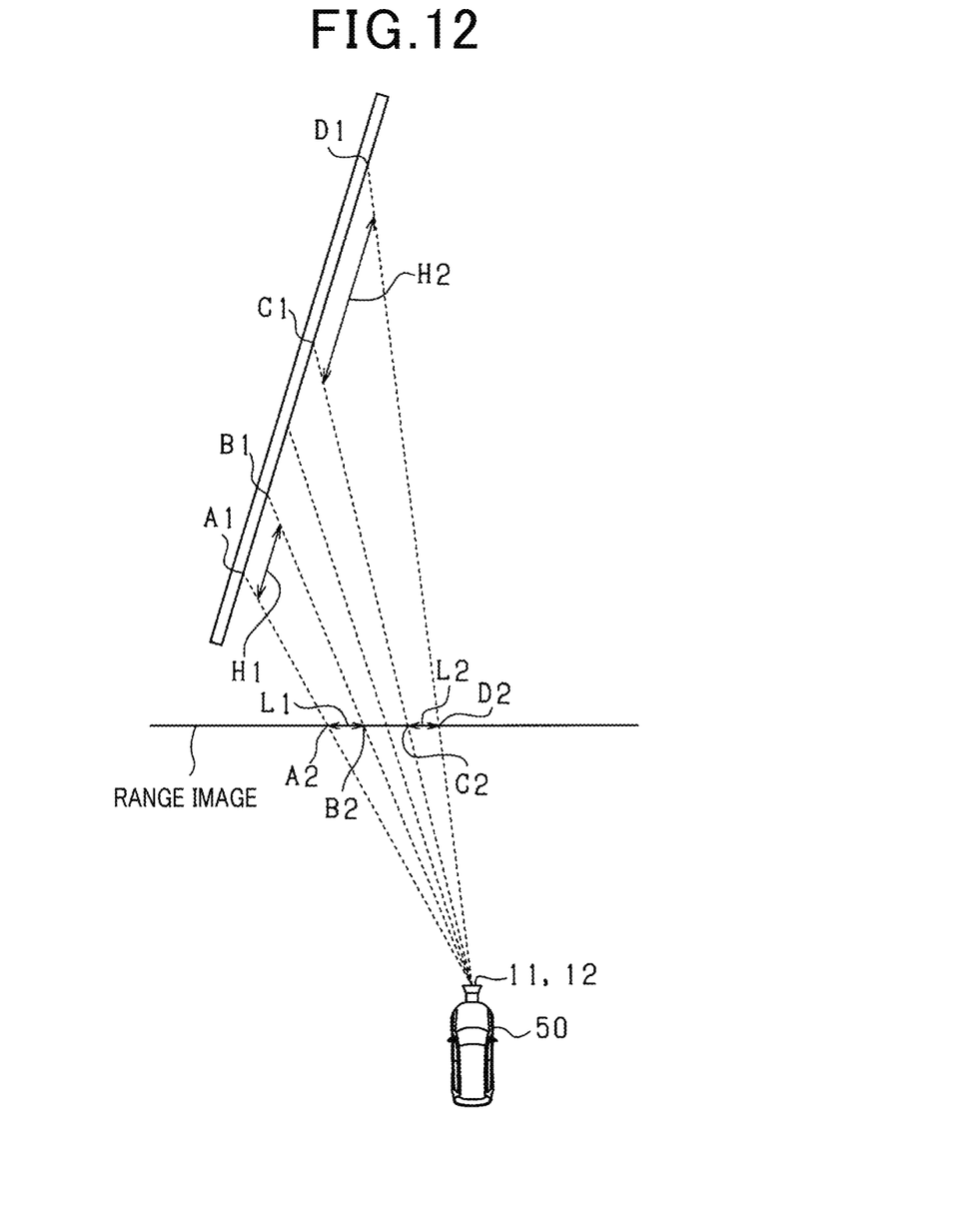
FIG. 12 is a wall extending further away from an own vehicle in real space depicted in a range image.

As shown in FIG. 12, an object, such as a wall or the like, extending further away from the own vehicle 50 in real space is depicted in the range image. Given positions A1, B1, C1, and D1 of the object in real space respectively correspond to positions A2, B2, C2, and D2 on the range image. It is assumed that, in real space, a distance H2 between the positions C1 and D1 in the horizontal plane is much greater than a distance H1 between the positions A1 and B1 in the horizontal plane. However, in the range image, a horizontal distance L1 between the positions A2 and B2 and a distance L2 between the positions C2 and D2 are depicted to be substantially the same.

Therefore, to determine the distance continuity of the subgroup to be merged with the subgroup as a merging reference based on a distance between these subgroups in the horizontal plane, it is desirable to adaptively change the decision distances in response to various positional relationships between the subgroups. It is desirable to set a decision distance used to determine distance continuity with a portion between the points C2 and D2 to greater than a decision distance used to determine distance continuity with a portion between the points A2 and B2. To this end, it is necessary to prepare beforehand a map storing decision distances for various potential positional relationships between subgroups, which may consume a limited memory capacity of a vehicle-mounted device. In such an approach, setting the decision distance to a larger one (e.g., the decision distance used to determine distance continuity with the portion between the points C2 and D2) may cause over-grouping of different objects. For example, if a pedestrian is near the wall extending further away from the own vehicle 50, the wall and the pedestrian may be mistakenly over-grouped together to form a merged group.

In the present embodiment, the distance continuity of the subgroup to be merged with the subgroup as a merging reference is determined using the object angle θ. Taking into account the fact that the decision distances d1, d2 calculated based on the distance to the merging reference, the prescribed width Dn, and the decision angle φ may change in response to the position of the merging reference, setting only one decision angle φ allows the distance continuity to be determined in response to various positional relationships between the subgroups. Therefore, use of the object angle θ to determine the distance continuity on the horizontal plane between the subgroups can save memory consumption.

Figure 9:
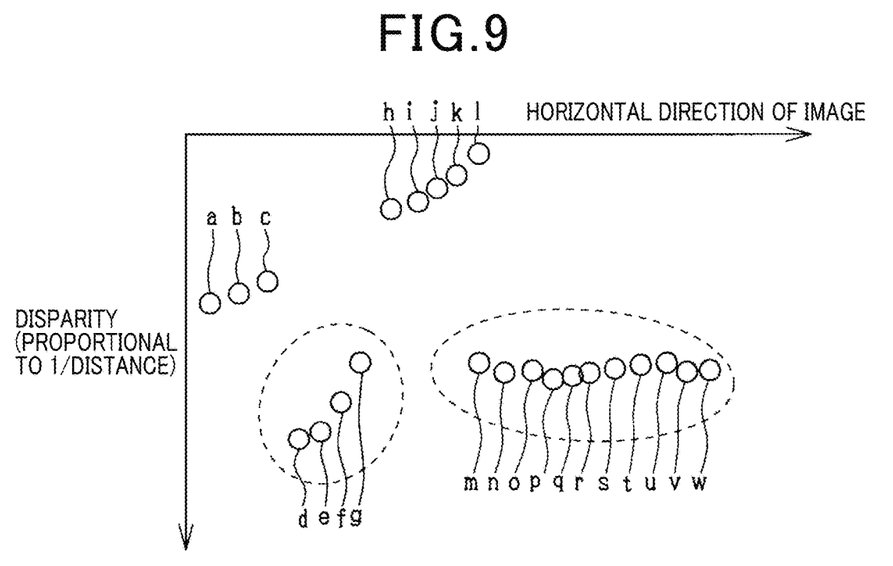
FIG. 9 is an example of disparities of subgroups.

A method of merging subgroups will now be explained with reference to FIGS. 8-9. FIG. 9 shows a disparity for each subgroup that is given by a representative value, such as a median, of a disparity range corresponding to the subgroup.

The distance continuity between subgroups is determined from the left end to the right end of the range image. In an example shown in FIGS. 8 and 9, it is determined that there is distance continuity of the subgroup b with the subgroup a.

While it is determined that there is distance continuity of the subgroup c with the subgroup b, it is determined that there is no distance continuity of the subgroup d with the subgroup c. Therefore, the subgroups a-c are merged together to generate a merged group (referred to as a first merged group). The subgroup d is separated from the subgroup c. In a similar manner, beginning with the subgroup d, it is determined iteratively that there is distance continuity between adjacent subgroups until the subgroup g is reached. The subgroups d-g are merged together to generate another merged group (referred to as a second merged group), where the subgroup h is separated from the subgroup g.

Again, beginning with the subgroup h, it is determined iteratively that there is distance continuity between adjacent subgroups until the subgroup k is reached. Since a column region adjacent to the subgroup k includes two subgroups l and m. Distance continuity determination processing is performed for each of the subgroups l and m. While it is determined that there is distance continuity between the subgroup k and the subgroup l, it is determined that there is no distance continuity between the subgroup k and the subgroup m. In addition, it is determined that there is no distance continuity between the subgroup l and its adjacent subgroup n. Thus, the subgroups h-l are merged together to generate another merged group (referred to as a third merged group). Still again, beginning with the subgroup m, it is determined iteratively that there is distance continuity between adjacent subgroups until the subgroup w is reached. Therefore, the subgroups m-w are merged together to generate further another merged group (referred to as a fourth merged group).

Figure 10:
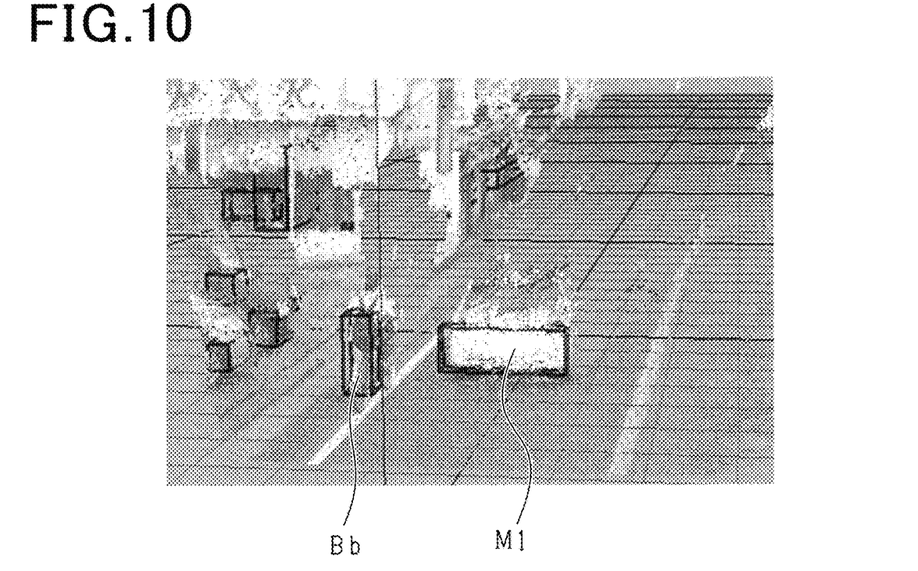
FIG. 10 is an example of merged groups generated by merging subgroups.

FIG. 10 shows the first to fourth merged groups generated as above and overlaid on the range image. As shown in FIG. 10, the vehicle M1 and the bicycle Bb belong to different merged groups.

The object detector 25 detects objects in each merged group generated by the merger 24 in the range image. With this technique, the vehicle M1 and the bicycle Bb located at similar distances from the own vehicle 50 can be separately detected.

Figure 13:
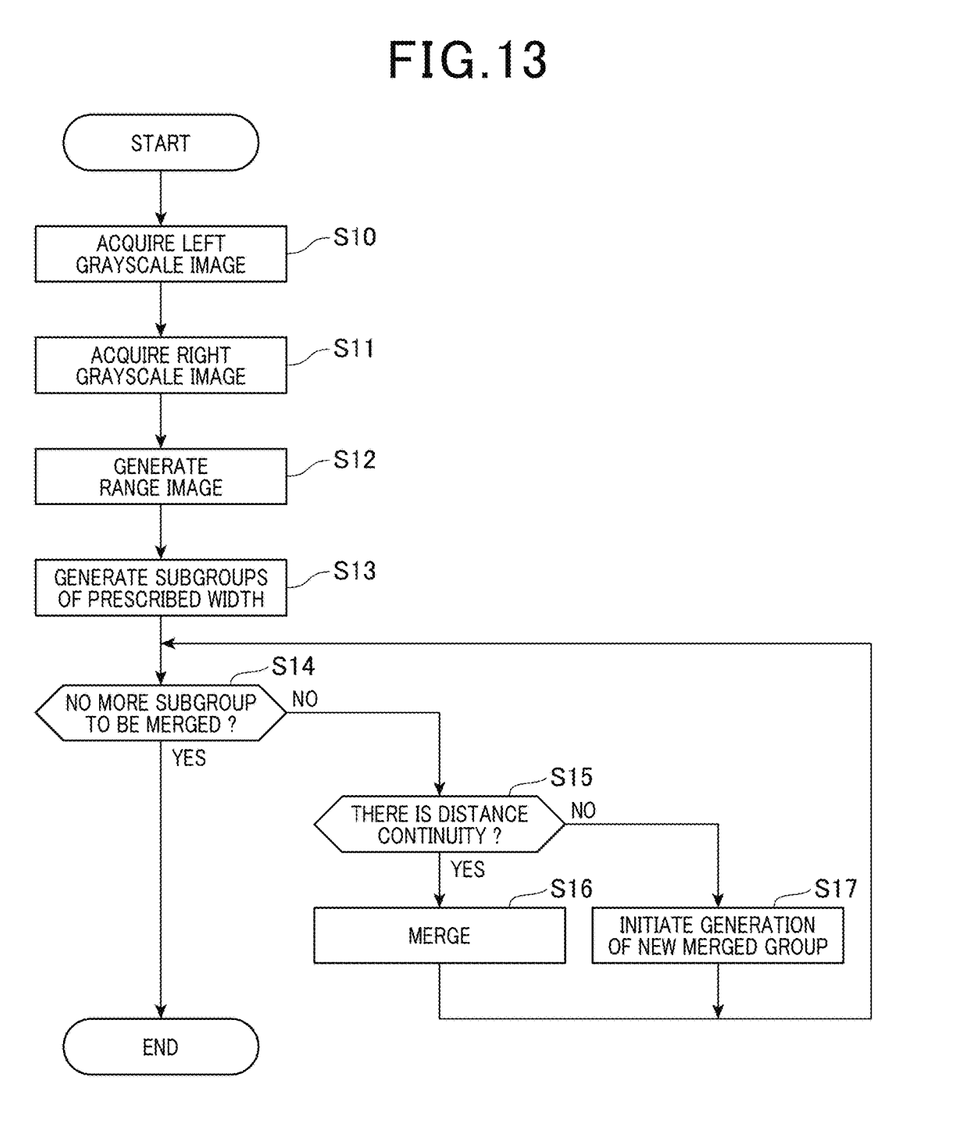
FIG. 13 is a flowchart of merged group generation processing.

Merged group generation processing to be performed in the ECU 20 will now be described with reference to a flowchart of FIG. 13. This processing is performed iteratively every predetermined time interval.

First, in step S10, the image acquirer 21a acquires a left grayscale image captured by the left camera 11. Subsequently, in step S11, the image acquirer 21a acquires a right grayscale image captured by the right camera 12. In step S12, the range image generator 21 generates a range image indicative of a disparity distribution from a pair of the left and right grayscale images acquired in steps S10, S11.

Subsequently, in step S13, the pixels of the range image are grouped in prescribed width Dn by the subgroup generator 22. More specifically, the subgroup generator 22 horizontally divides the range image into a number of column regions of prescribed width Dn, and for each column region, generates subgroups that fall within a given range of disparity.

For each of the subgroups generated in step S13, the merger 24 merges the subgroup and another subgroup that is horizontally continuous in distance with the subgroup in the range image. More specifically, in step S14, the merger 24 determines, for each of the subgroups generated in step S13, whether or not there is a subgroup to be merged with the subgroup. For example, the merger 24 sequentially determines, from the left end to the right end of the range image, whether or not there is a subgroup to be merged with a subgroup as a merging reference on the right side of the merging reference. If there is no more subgroup to be merged, then the process flow ends.

If in step S14 it is determined that there is a subgroup to be merged, then in step S15 the continuity determiner 23 determines whether or not the object angle θ defined as above is greater than the decision angle φ. If in step S15 it is determined that there is distance continuity between the subgroup to be merged and the merging reference, then in step S16 the merger 24 merges the merging reference and the subgroup to be merged. Then the process flow returns to step S14, where the subgroup to be merged serves as a new merging reference.

If in step S15 it is determined that there is no distance continuity between the merging reference and the subgroup to be merged, then generation of a current merged group ends with the current merging reference. The subgroup to be merged serves as a new merging reference. In step S17, the process flow returns to step S14, where generation of a new merged group begins with the new merging reference The present embodiment described as above can provide the following advantages.

(A1) The range image indicative of a distribution of disparities is horizontally divided into a number of column regions of prescribed width Dn. For each column region, subgroups are generated, each of which continuously extends in the vertical direction of the range image and falls within a given distance range. For each of the subgroups generated in the column regions, it is determined there is distance continuity between the subgroup and its horizontally adjacent subgroup in the range image. Horizontally continuous-in-distance subgroups are merged together to generate a merged group. Thus, the subgroups that are horizontally continuous in distance are merged together in the range image, whereby merged groups can be generated, each of which corresponds to a respective object. Further, the merged groups can be generated using only the range image, which can suppress the processing load. An object can be detected in each of regions of the range image corresponding to the respective merged subgroups, which can lead to higher accuracy of detecting objects. Therefore, objects can be detected while both suppressing processing load and preventing object detection performance degradation in a compatible manner.

(A2) The prescribed width Dn is set to a width corresponding to a width of a reference object at a given distance from the own vehicle in the range image, which allows the reference object to be accurately detected at the given distance from the own vehicle and further allows an object having a width greater than the width of the reference object.

(A3) The distance continuity between the subgroups is determined based on the object angle θ that is an acute angle between the reference line and the object line (as a decision line), which allows the distance continuity to be determined accurately using the single decision angle φ, regardless of any positional relationship between the subgroup to be merged and the merging reference. This can suppress memory consumption.

(A4) Instead of using a distance transformed from the disparity, the disparity is directly used as distance information. This allows the merged groups to be generated without transformation from the disparity to the distance. This can further suppress the processing load.

Other Embodiments (B1) In the above embodiment, the distance continuity between the subgroups is determined using the decision angle φ. Alternatively, if a difference in disparity between a subgroup as a merging reference and a subgroup to be merged is less than a decision disparity (corresponding to a decision distance), it may be determined that there is distance continuity between the two subgroups. In such an alternative embodiment, it is desirable to prepare beforehand a map storing decision disparities (or decision distances) for various potential positional relationships between subgroups.

(B2) In the above embodiment, the range image indicative of a distribution of disparities is generated. Alternatively, a range image may be generated that is indicative of a distribution of distances calculated from the disparities. In such an alternative embodiment, the distances calculated from the disparities may be used as distance information.

(B3) In the above embodiment, the range image is generated using the stereoscopic camera formed of a pair of left and right cameras. Alternatively, the range image may be generated using an RGB-D camera or a structure-from-motion (SFM) technique. Still alternatively, a radar, such as a millimeter-wave radar, may be mounted on the own vehicle to scan and detect distances to objects located around the own vehicle, and the range image may be generated by using the detected distances of the objects.

(B4) In the above embodiment, the range image is horizontally divided into a number of column regions. Alliteratively, the range image is vertically divided into a number of row regions. In such an alternative embodiment, for each of the row regions, distance continuity may be determined between a subgroup generated in the row region and a subgroup generated in it adjacent row region.

(B5) The vertical direction of the range image is perpendicular to the horizontal direction of the range image. More generally, the vertical direction of the range image may be a direction of the range image corresponding to an up-down direction in real space.

(B6) Similarly, the horizontal direction of the range image may be a direction of the range image corresponding to a left-right direction in real space.

(B7) In the above embodiment, the range image is horizontally divided into a number of column regions. Alternatively, the range image may be obliquely divided into a number of oblique regions. The oblique direction intersects with both vertical and horizontal directions of the range image. In such an alternative embodiment, for each of the oblique regions, distance continuity may be determined between a subgroup generated in the oblique region and a subgroup generated in it adjacent oblique region.

What is claimed is:

1. An object detection apparatus comprising:
   a range image generator configured to, based on distance information indicative of distances from a given measurement point to objects in real space, generate a range image indicative of a distribution of distance information of objects located around the measurement point, a virtical direction of the range image corresponding to an up-down direction of the real space;
   a subgroup generator configured to divide the range image generated by the range image generator in a horizontal direction of the range image into a number of column regions of prescribed width, and for each column region, generate one or more subgroups that extend continuously in a vertical direction of the range image and fall within a given range of distance information;
   a continuity determiner configured to, for each of the subgroups generated by the subgroup generator, determine whether or not there is distance continuity between the subgroup and its horizontally adjacent subgroup in the range image;
   a merger configured to merge together horizontally continuous-in-distance subgroups, between any pair of horizontally adjacent subgroups of which it is determined by the continuity determiner that there is distance continuity, to generate a merged group; and
   an object detector configured to detect an object in each of regions of the range image corresponding to the respective merged groups generated by the merger.

2. The apparatus of claim 1, wherein the prescribed width is set to a width corresponding to a width of a reference object at a given distance from the measurement point in the range image.

3. The apparatus of claim 1, wherein
   an acute angle between a reference line passing through a position of a subgroup as a merging reference and the measurement point and an object line passing through a position of a subgroup to be merged and the position of the subgroup as the merging reference is referred to as an object angle in a horizontal plane, and
   the continuity determiner is configured to, if the object angle is greater than a decision angle, determine that there is distance continuity between the subgroup as the merging reference and the subgroup to be merged in the horizontal plane.

4. The apparatus of claim 1, wherein the continuity determiner is configured to, if a difference in distance information between a subgroup as a merging reference and a subgroup to be merged is less than a decision distance, determine that there is distance continuity between the subgroup as the merging reference and the subgroup to be merged.

5. The apparatus of claim 1, wherein
   the distance information indicates disparities between a pair of left and right grayscale images, and
   the range image generator is configured to generate a range image indicative of a distribution of the disparities.

6. An object detection apparatus comprising:
   a range image generator configured to generate a range image based on a pair of left and right grayscale images;
   a subgroup generator configured to divide the range image into a number of prescribed regions, and in each prescribed region, generate one or more subgroups based on distance continuity;
   a merger configured to, for each of the subgroups generated by the subgroup generator, determine whether or not there is distance continuity between the subgroup and its horizontally adjacent subgroup in the range image, and merge together horizontally continuous-in-distance subgroups to generate a merged group; and
   an object detector configured to detect an object in each of regions of the range image corresponding to the respective merged groups generated by the merger.

7. An object detection method comprising steps of:
   based on distance information indicative of distances from a given measurement point to objects in real space, generating a range image indicative of a distribution of distance information of objects located around the measurement point, a vertical direction of the range image corresponding to an up-down direction of the real space;
   dividing the range image in a horizontal direction of the range image into a number of column regions of prescribed width, and for each column region, generating one or more subgroups that extend continuously in a vertical direction of the range image and fall within a given range of distance information;

for each of the subgroups, determining whether or not there is distance continuity between the subgroup and its horizontally adjacent subgroup in the range image;

merging together horizontally continuous-in-distance subgroups, between any pair of horizontally adjacent subgroups of which it is determined that there is distance continuity, thereby generating a merged group; and detecting objects in each of regions of the range image corresponding to the respectively merged groups.

* * * * *